(12) United States Patent
Schroeder

(10) Patent No.: US 9,627,952 B2
(45) Date of Patent: Apr. 18, 2017

(54) PENDULUM APPARATUS HAVING A SUSTAINED SWING

(71) Applicant: Maurice Schroeder, Orlando, FL (US)

(72) Inventor: Maurice Schroeder, Orlando, FL (US)

( * ) Notice: Subject to any disclaimer, the term of this patent is extended or adjusted under 35 U.S.C. 154(b) by 151 days.

(21) Appl. No.: 14/245,377

(22) Filed: Apr. 4, 2014

(65) Prior Publication Data

US 2014/0300215 A1 Oct. 9, 2014

Related U.S. Application Data

(60) Provisional application No. 61/808,907, filed on Apr. 5, 2013.

(51) Int. Cl.
*H02K 33/00* (2006.01)
*H02K 53/00* (2006.01)

(52) U.S. Cl.
CPC .............. *H02K 53/00* (2013.01); *Y10S 74/09* (2013.01)

(58) Field of Classification Search
CPC ............................... H02K 53/00; Y10S 74/09
USPC ....................... 310/30, 36, 80, 152
See application file for complete search history.

(56) References Cited

U.S. PATENT DOCUMENTS

| 1,078,058 | A |  | 11/1913 | Moore | |
|---|---|---|---|---|---|
| 3,899,703 | A | * | 8/1975 | Kinnison | ............... H02K 7/065 310/103 |
| 4,300,067 | A | * | 11/1981 | Schumann | ............. H02K 53/00 310/103 |
| 4,378,166 | A |  | 3/1983 | Itami et al. | |
| 4,395,137 | A |  | 7/1983 | Wiley | |
| 5,432,382 | A | * | 7/1995 | Pawlowski | ............ H02K 33/00 290/1 R |
| 5,483,131 | A |  | 1/1996 | Ito | |
| 6,781,270 | B2 |  | 8/2004 | Long | |
| 7,902,703 | B2 | * | 3/2011 | Ucer | ...................... H01L 37/04 310/80 |
| 8,299,636 | B2 |  | 10/2012 | Cornish | |
| 8,760,020 | B2 | * | 6/2014 | Froelich | ................. H02K 53/00 310/20 |

(Continued)

OTHER PUBLICATIONS

Introduction to Electrodynamics, Davis J. Griffiths, 1999, Prentice Hall Inc, p. 207.*

(Continued)

*Primary Examiner* — Hanh Nguyen
(74) *Attorney, Agent, or Firm* — Robert L. Wolter; Beusse, Wolter, Sanks & Maire PLLC

(57) ABSTRACT

An apparatus (100), including: a pendulum (102) having a pendulum magnet arrangement; a stationary magnet (118, 122) positioned such that a magnetic field of the stationary magnet repels the pendulum magnet as it approaches the stationary magnet; a magnetic shielding apparatus (126, 128) configured to intermittently shield the stationary magnet from the pendulum magnet; and a power source configured to supply power to the magnetic shielding apparatus. The magnetic shielding apparatus is configured to shield the stationary magnet from the pendulum magnet as the pendulum magnet approaches an apex position (16, 42) of a cycle. As the pendulum, magnet arrangement recedes from the apex position a repulsion associated with an interaction of a fully unshielded magnetic field of the stationary magnet and a magnetic field of the pendulum magnet arrangement is effective to accelerate the pendulum.

20 Claims, 10 Drawing Sheets

(56) References Cited

U.S. PATENT DOCUMENTS

| | | |
|---|---|---|
| 2004/0070208 A1 | 4/2004 | Chiu |
| 2004/0179958 A1 | 9/2004 | Miyake |
| 2005/0248159 A1 | 11/2005 | Seoane |
| 2008/0001579 A1 | 1/2008 | Claypool |
| 2008/0012435 A1* | 1/2008 | Tiemann ................ H02K 53/00 310/46 |
| 2009/0051314 A1* | 2/2009 | Raghuprasad ......... H02K 53/00 320/108 |
| 2010/0148517 A1 | 6/2010 | Duclos |
| 2010/0237631 A1 | 9/2010 | Yu |
| 2013/0320683 A1* | 12/2013 | Sunar .................... H02K 53/00 290/1 R |

OTHER PUBLICATIONS

Gardner Dexter Hiscox, "Mechanical Appliances, Mechanical Movements and Novelties of Construction," N.W. Henley Publishing Company, 402 pages http://books.google.com/books?id=mRFLAAAAMAAJ&pg=PA385#v=onepage&q &f=false, 1904.

Overunity, "Forum Thread." http://www.overunity.com/12604/permanent-magnet-pendulum-motor/#.UzxTcKK2yW8, 2012.

Patrick Kelly, "Chapter 4: Gravity-Powered Systems," http://www.free-energy-info.co.us/Chapt4.html, 2009.

\* cited by examiner

PENDULUM APPARATUS HAVING A SUSTAINED SWING

This application claims benefit of the Apr. 5, 2013 filing date of U.S. provisional patent application No. 61/808,907 which is incorporated by reference herein.

FIELD OF THE INVENTION

The invention relates to a pendulum apparatus with a sustained swing of the pendulum.

BACKGROUND OF THE INVENTION

Energy costs associated with energy production from popular natural resources such as fossil fuels have increased over time. This, together with a growing awareness of the limited availability of these natural resources, has prompted growing efforts toward sustainable energy production. Sustainable energy production meets the energy needs of the present without compromising the ability to meet future energy needs. This can be accomplished using renewable energy, such as solar energy and wind energy. However, these technologies are still developing.

In addition to renewable energies, known phenomena such as magnetism and gravity can be configured such that they work together to generate force. For example, gravity generates force that permits the oscillating motion of a pendulum. Permanent magnets have long been used to help turn motors and move trains. However, without intervention, movements in these arrangements quickly decay due to energy losses such as friction etc. This renders these arrangements unsuitable in their current state for energy production. Consequently, there is room in the art to create more efficient arrangements that may be able to better exploit magnetism and gravity, and thereby render this technology viable for a wider range of applications.

BRIEF DESCRIPTION OF THE DRAWINGS

The invention is explained in the following description in view of the drawings that show.

DETAILED DESCRIPTION OF THE INVENTION

The present inventor has devised a unique apparatus that selectively shields and unshields magnetic fields associated with magnets to drive a pendulum such that it has a sustained swing. Electrical energy from a battery or grid electricity is used to operate an arrangement that selectively shields and unshields the magnetic fields. The pendulum may be used for entertainment purposes.

Figure 1:
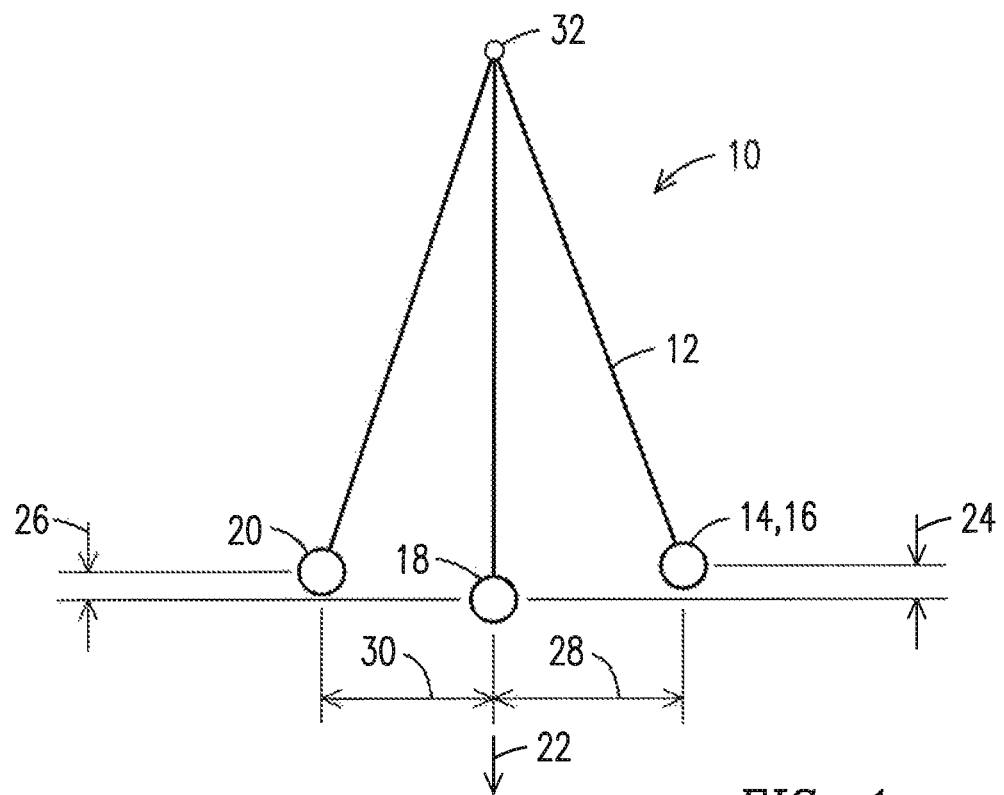
FIG. 1 is a sketch of a conventional prior art pendulum arrangement.

FIG. 1 shows a conventional arrangement 10 having a pendulum 12 with a bob 14 in an apex position 16, a neutral position 18, and an opposite apex position 20. In this arrangement 10 gravity acts in a gravity direction 22. It can be seen that an apex height 24, which occurs earlier in time during a cycle of the pendulum 12, is greater than an opposite apex height 26. Necessarily then, an apex horizontal distance 28 is greater than an opposite apex horizontal distance 30. This occurs because the pendulum 12 encounters resistance as it swings out and back during each cycle, including, for example, friction at the pivot 32, and possibly wind resistance etc. Consequently, due to the presence of gravity the bob 14 will eventually settle into the neutral position 18.

Figure 2:
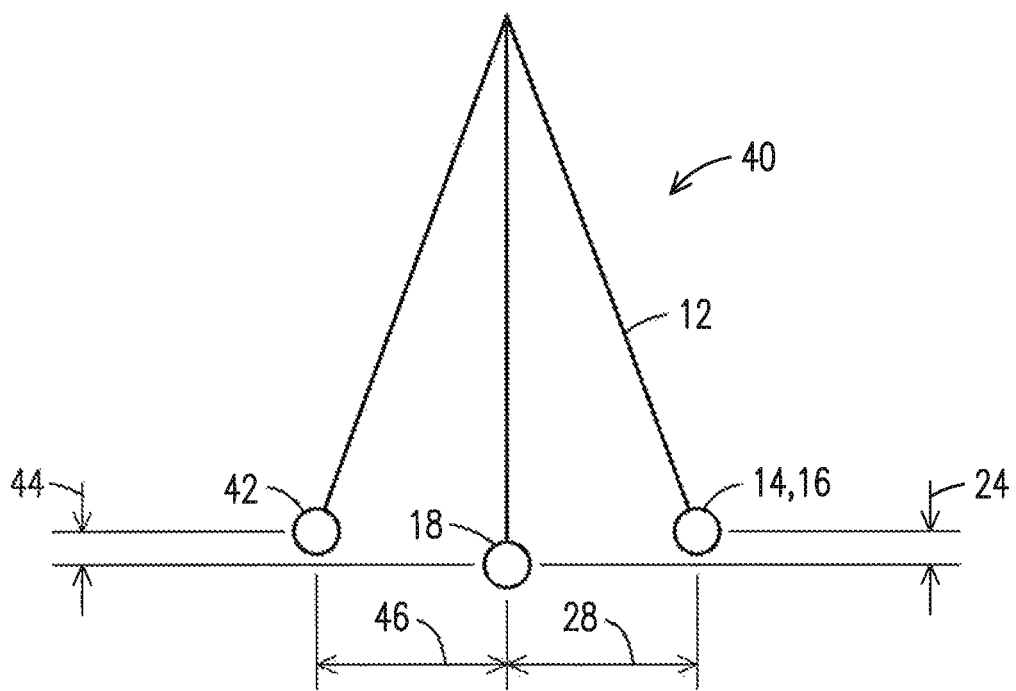
FIG. 2 is a sketch of an exemplary embodiment of a pendulum arrangement.

The inventor seeks to create an arrangement having an exemplary embodiment whose motion can be represented as seen in FIG. 2. In the proposed arrangement 40 the pendulum 12 and bob 14 may start in the same apex position 16 as in FIG. 1, and may travel through the same neutral position 18 as in FIG. 1. However, in this exemplary embodiment the opposite apex position 42 would have an opposite apex height 44 and an opposite apex horizontal distance 46 that is greater than the opposite apex height 26 and the opposite apex horizontal position 30 of FIG. 1. The inventor proposes to do so by "pushing" the bob 14 with at least enough force to overcome any resistance encountered during the travel between the apex position 16 and the opposite apex position 42. The push may be at least enough to return the bob 14 to the apex position 16. The inventor optionally proposes to push the bob 14 again as the bob 14 travels from the opposite apex position 42 to return to the apex position 16. The two apex positions may be symmetrically disposed about the neutral position 18. Alternately, the apex height 24 and the apex horizontal distance 28 may be entirely different than the opposite apex height 44 and the opposite apex horizontal distance 46. In such an exemplary embodiment the two apex positions would not be symmetric about the neutral position 18. However, regardless of what apex position 16 and opposite apex position 42 are selected, in all exemplary embodiments the bob 14 will always be able to at least reach the selected apex positions.

The inventor proposes to push the bob 14, which is essentially a large weight, using magnetic force. In particular, the inventor proposes to use very powerful, rare earth magnets. A stationary magnet will be positioned proximate each apex position and at least one pendulum magnet will be positioned on the bob 14. An interaction of a magnetic field of the stationary magnet and a magnetic field of the pendulum magnet may serve to decelerate the bob 14 as the bob 14 approaches the respective apex position. This same interaction will serve to accelerate the bob 14 as it recedes from the operative stationary magnet.

Under conventional arrangements the magnetic field of the stationary magnet would decelerate the approaching bob 14 with the same force it would accelerate the receding bob 14, resulting in a net force of zero. Consequently, the cycling of the pendulum 12 would eventually succumb to the resistance forces experienced during the cycle and the cycling would decay to the neutral position 18. The inventor innovatively proposes to intermittently shield the stationary magnet from the pendulum magnet, so that the stationary magnet is sometimes unshielded and frilly repels the pendulum magnet, and at other times the stationary magnet is fully shielded and therefore repels the pendulum magnet to a lesser degree. When unshielded, the magnetic field of the stationary magnet and the magnetic field of the pendulum magnet are free to interact and generate repulsion at magnitudes associated with the full strength of the unshielded stationary magnet. When fully shielded, the magnetic field of the stationary and the magnetic field of the pendulum magnet may still interact, but they generate repulsion at reduced magnitudes associated with the shielded field of the shielded stationary magnet. As used herein, fully unshielded means that a line of sight between two magnets is unblocked. Fully shielded means that the line of sight between two magnets is completely blocked. There is an associated transition between when the stationary magnet is fully shielded and fully unshielded. As used herein, the transition occurs when the line of sight between two magnets is partially blocked. A duration of this transition may be minimized to minimize its effect, or it may be maximized to exploit its effect as described below.

By controlling a timing of the intermittent shielding, an arrangement can be created where a bob 14 approaches the apex position 16 during a time where the stationary magnet is fully shielded, or transitioning from being fully shielded, thereby reducing the interaction of the magnetic field of the stationary magnet with that of the pendulum magnet. This, in turn, reduces the repulsion and associated deceleration energy on the bob 14. The bob 14 can then be made to recede from the apex position 16 during a time when the stationary magnet is fully or partially unshielded. This maximizes an interaction of the magnetic field of the stationary magnet with that of the pendulum magnet. This, in turn, maximizes the repulsion and associated acceleration energy on the bob 14. If the net energy (acceleration energy less deceleration energy) is exactly equal to the energy lost during the subsequent cycle, then the bob 14 will return to the exact same apex position. This particular apex position would then also be the equilibrium position.

In an exemplary embodiment where the magnetic field of the stationary magnet is fully shielded until the bob 14 reaches its apex, at which time the shielding effect transitions to being unshielded and the repulsion of the interaction of the two fully unshielded magnets is present, there may be an amplifying oscillations mode where the cycle of the pendulum 12 wants to grow with each successive cycle because more energy is imparted to the bob 14 than is lost due in the cycle. The amount of amplification depends on the difference between the magnitude of the acceleration force and the deceleration force created by the intermittent shielding. Ideally the ratio would be enough such that sufficient energy is imparted to the pendulum 12 to overcome all energy losses experience by the pendulum 12 with a minimum buffer to account for unexpected increases in energy losses, but where the buffer is minimized to slow a rate of amplification.

For example, if the apex position of a cycle overshoots the equilibrium position, then the pendulum 12 magnet is closer to the stationary magnet by a given overshoot distance. There would be additional energy loss associated with a cycle from the overshoot apex position and back because the pendulum 12 would be traveling further and hence experience more friction. However, because the stationary magnet and the pendulum magnet are also closer by the given overshoot distance there is a greater repulsive force generated. Due to the nature of magnetic field strength growing at a non linear rate with distance, the increase in repulsive force and associated potential energy imparted to the pendulum bob 14 at the overshoot position may be greater than the increased energy losses associated with a cycle having the overshoot apex position. Since more energy will be imparted to the bob 14 than will be lost in the following cycle, when the bob 14 returns to the overshoot apex position after the following cycle it will have a surplus of total energy. Thus the pendulum 12 will continue past the overshoot apex position and arrive at a second overshoot position closer yet to the stationary magnet.

Using this simple model this amplification will continue until the pendulum 12 is physically prevented from further amplification. (In reality the more complex locally varying magnetic field strength, for example that near a surface of the magnets, together with the more complex frictional losses associated with the wider swing of the pendulum 12 may permit the arrangement to reach another equilibrium cycle with a swing greater than that of the swing associated with the equilibrium position of the simply model.) Further, imperfections in the apparatus itself may limit amplification. For example, when encountering great repulsive forces a pendulum arm may deflect from its ideal plane of motion and this deflection might absorb some of the repulsion energy. The deflection may be the result of a natural flexibility of the arm itself, or a natural give where the pivot axle sleeve 202 and associated bearings secure to the frame 106. Any number of factors such as these may cause the apparatus to reach an equilibrium not explained by the simple model used above, but plausible given the normal limitations of the apparatus actually used.

Physical swing control can be accomplished by increasing a resistance of the pendulum 12 to mitigate the increasing repulsion. This may manifest as a physical stop such as a bumper or energy absorbing piston etc. Alternately, the resistance may be physically controlled to be non linear so that increasing swings result in increasing resistance that counter the increasing swings. The swing of the pendulum 12 may be actively controlled by actively controlling the cycling of the shield to apply more deceleration such that any accumulated amplitude is reduced, bringing the cycle back closer to the equilibrium position. Other active control may include controlling a resistance associated with any other devices connected to the arrangement, including an electrical generator. This sort of control would require a buffer space between the equilibrium position and the stationary magnet large enough to permit amplifying oscillations to grow and then be mitigated. In order to prevent contact between the pendulum 12 magnet and the magnetic shield the buffer space would need to be between the magnetic shield and the point of the bob 14 nearest to the stationary magnet.

Still another control alternative may be built into the arrangement. Specifically, the stationary magnet may be mounted on a mounting structure that may be designed to yield when the stationary magnet and the pendulum magnet generate great repulsive forces associated with a close proximity of amplified oscillations. This yielding changes the dynamic of the arrangement by repositioning the stationary magnet and thereby changing a magnitude of the repulsion between the magnets. The strength of the structure can be tailored so that the amount of yield results in mitigating the amplified oscillations and returns them closer to the equilibrium apex until they amplify and need to be mitigated again. Any or all of the above techniques may be used to control these amplified oscillations.

A magnetic shielding apparatus may take any form capable of periodically shielding the stationary magnet from the pendulum magnet. In an exemplary embodiment, not meant to be limiting, the magnetic shielding apparatus may include a spinning wheel disposed transverse to an arc defined by movement of the pendulum magnet and disposed between the stationary magnet and the pendulum magnet. There may be a planar metal shield positioned on the spinning wheel such that the metal shield periodically passes in front of the stationary magnet, thereby shielding the stationary magnet. This may be timed so that the metal shield passes in front of the stationary magnet as the bob 14 is approaching the stationary magnet, and so that the metal shield moves from in front of the stationary magnet as the bob 14 is receding from the stationary magnet. In such a configuration there is a transition from when the stationary magnet is fully shielded and when it is fully unshielded. The duration and timing of the transition can be tuned to reach the optimum balance of deceleration, acceleration, and apex positioning of the bob 14 in accord with the teachings above. Alternately the magnetic shielding apparatus may include, for example, a linearly reciprocating metal shield that moves into and out of the shielding position.

An electrical generator may be used to draw electrical energy from the motion of the pendulum 12. For example, a generator may receive input from the pendulum 12 at the pivot 32. In an exemplary embodiment where only one pendulum 12 is used, and where the generator is configured to be turned on only one direction, a one-way mechanism such as a one-way bearing may be used to draw energy during a power stroke. A power stroke is a stroke of the pendulum 12 whose direction of motion coincides with an input direction of the generator. Upon completion of the power stroke the magnets of the arrangement will return the pendulum 12 to the opposite apex position 42 in a recovery stroke. During the power stroke, the pendulum 12 may be slowed due to the increased resistance of the generator. This may lengthen a time of the power stroke (from the opposite apex position 42 to the apex position 16) when compared to a time of the recovery stroke (from the apex position 16 to the opposite apex position 42). Further, since the generator is drawing energy from the pendulum 12, there will be less energy available to elevate the bob after passing the neutral position 18. Consequently, the apex height 24 of the apex position 16 may be less than an apex height 44 of the opposite apex position 42. Further, during the recovery stroke a velocity of the bob 14 may be greater than a bob 14 during the power stroke due to the relatively lower amount of friction. In this embodiment the swing may not be symmetric about the neutral position 18.

In an alternate exemplary embodiment an additional pendulum, having an additional pendulum magnet, and an additional stationary magnet may be arranged adjacent to the pendulum 12 so that the additional pendulum swings parallel to the pendulum 12, on the same pivot, and secured to the same generator. In this exemplary embodiment the additional pendulum could be made to swing out of synchronization with the pendulum 12. If they are 180 degrees out of synchronization then a power stroke associated with the additional pendulum could direct energy to the generator while the pendulum 12 is in its recovery stroke, and thus the generator would receive energy almost constantly. Alternately, the power strokes could overlap to any extent deemed desirable based on the operation conditions encountered our output characteristics desired. The generator may generate and deliver electricity to an energy storage device such as a battery. Alternately the energy may be used in any other way seen fit.

In an alternate exemplary embodiment for the pendulum 12 a second stationary magnet may be positioned opposite the stationary magnet and may be intermittently shielded and unshielded like the stationary magnet. The second stationary magnet and second shielding arrangement may operate to decelerate the pendulum 12 is it approaches the opposite apex position 42 and accelerate the pendulum 12 as it recedes from the opposite apex position 42. This would impart energy to the pendulum 12 that could be extracted during the power stroke by pushing the pendulum 12 into the power stroke.

Figure 3:
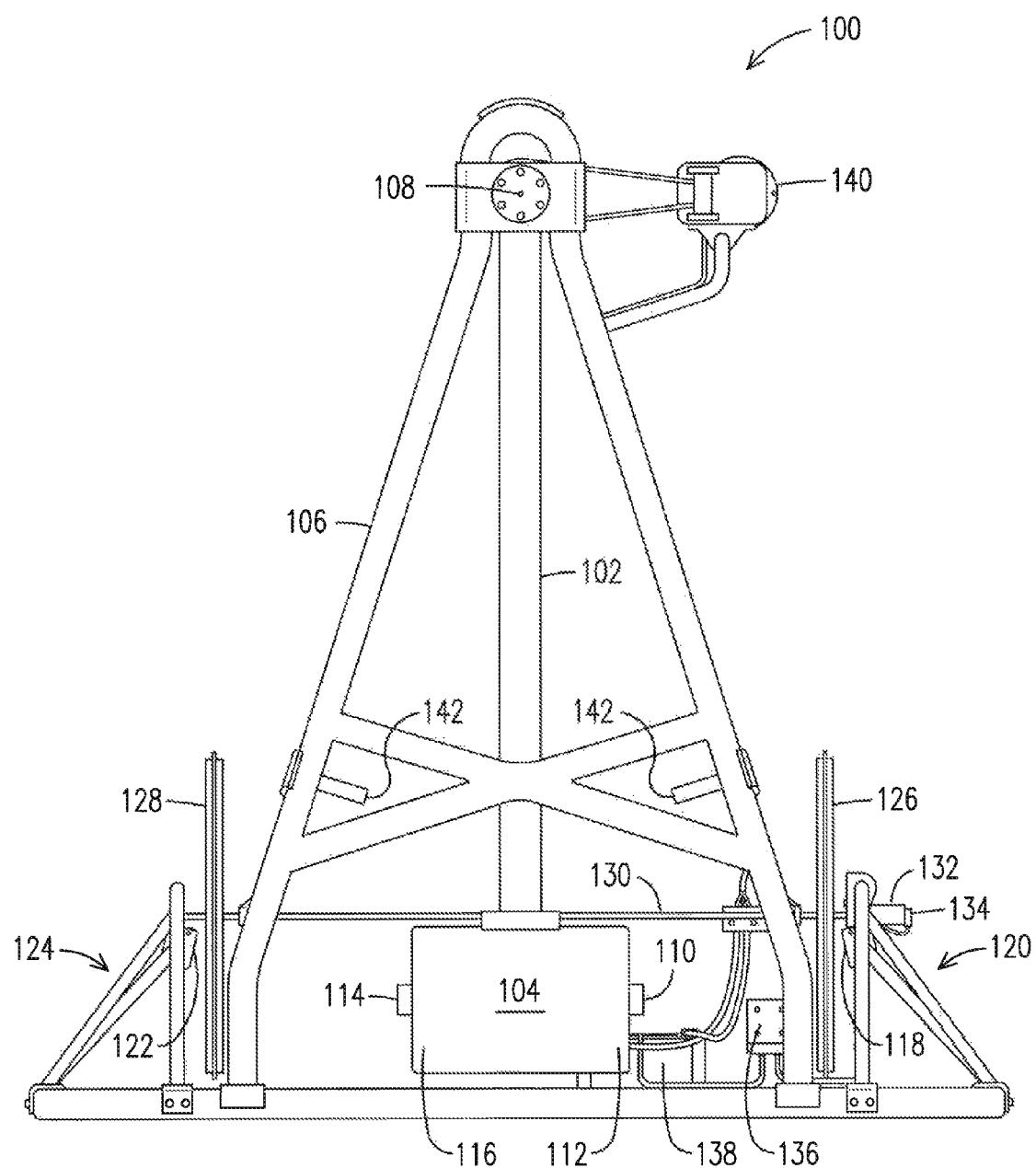
FIG. 3 is a first side view of an exemplary embodiment of a pendulum apparatus.

FIG. 3 shows an exemplary embodiment of a pendulum apparatus 100 having magnets disposed on respective ends of the bob. A pendulum 102 having a bob 104 is secured to a frame 106 and swings about a pivot axis 108. A proximate pendulum magnet 110 is secured to a proximate end 112 of the bob 104. A distal pendulum magnet 114 is secured to a distal end 116 of the bob 104. Together the proximate pendulum magnet 110 and the distal pendulum magnet 114 may be considered a pendulum magnet arrangement. A stationary magnet 118 is secured to a proximate end 120 of the frame 106, and a second stationary magnet 122 is secured to distal end 124 of the frame 106. While two magnets are secured, one each to the proximate end 112 and distal end 116 of the bob 104 in this exemplary embodiment, other arrangements are envisioned. For example, one magnet could be secured on and underside of the bob 104 and the stationary magnets could be repositioned to interact with that location of the underside magnet. Such an embodiment may require the underside of the pendulum to be rounded to provide clearance tier the corners of the bob 104 to clear the stationary magnets during its swing. Alternately, more than one magnet could be used on the proximate end 112 and distal end 116 of the bob 104 etc. Thus, a pendulum arrangement of the pendulum apparatus 100 may include two magnets, such as the proximate pendulum magnet 110 and the distal pendulum magnet 114 shown in FIG. 3, or the pendulum arrangement may include a sole magnet (not shown). Alternate embodiments may include even more than two magnets depending on design considerations etc.

A first shielding apparatus 126 is secured to the proximate end 120 of the frame 106 between the stationary magnet 118 and the proximate pendulum magnet 110. A second shielding apparatus 128 is secured to the distal end 124 of the frame 106 between the second stationary magnet 122 and the distal pendulum magnet 114. In this exemplary embodiment both the first shielding apparatus 126 and the second shielding apparatus 128 are secured to a shaft 130 which is controlled by a motor 132. A rotational position of the shaft 130, and hence the first shielding apparatus 126 and the second shielding apparatus 128 secured thereto, may optionally be monitored via a sensor 134 like an optical encoder, and controlled via a controller 136. The motor 132 may be driven by a battery 138 or any other source known to those in the art. The battery 138 may, in turn, receive electrical energy from an electrical generator 140 that is driven by motion of the pendulum 102. Alternately, the motor 132 may be driven form a discrete power source such as an external power supply not powered by the electrical generator 140. Stops 142 prevent the pendulum 102 from striking the first shielding apparatus 126 and the second shielding apparatus 128.

Figure 4:
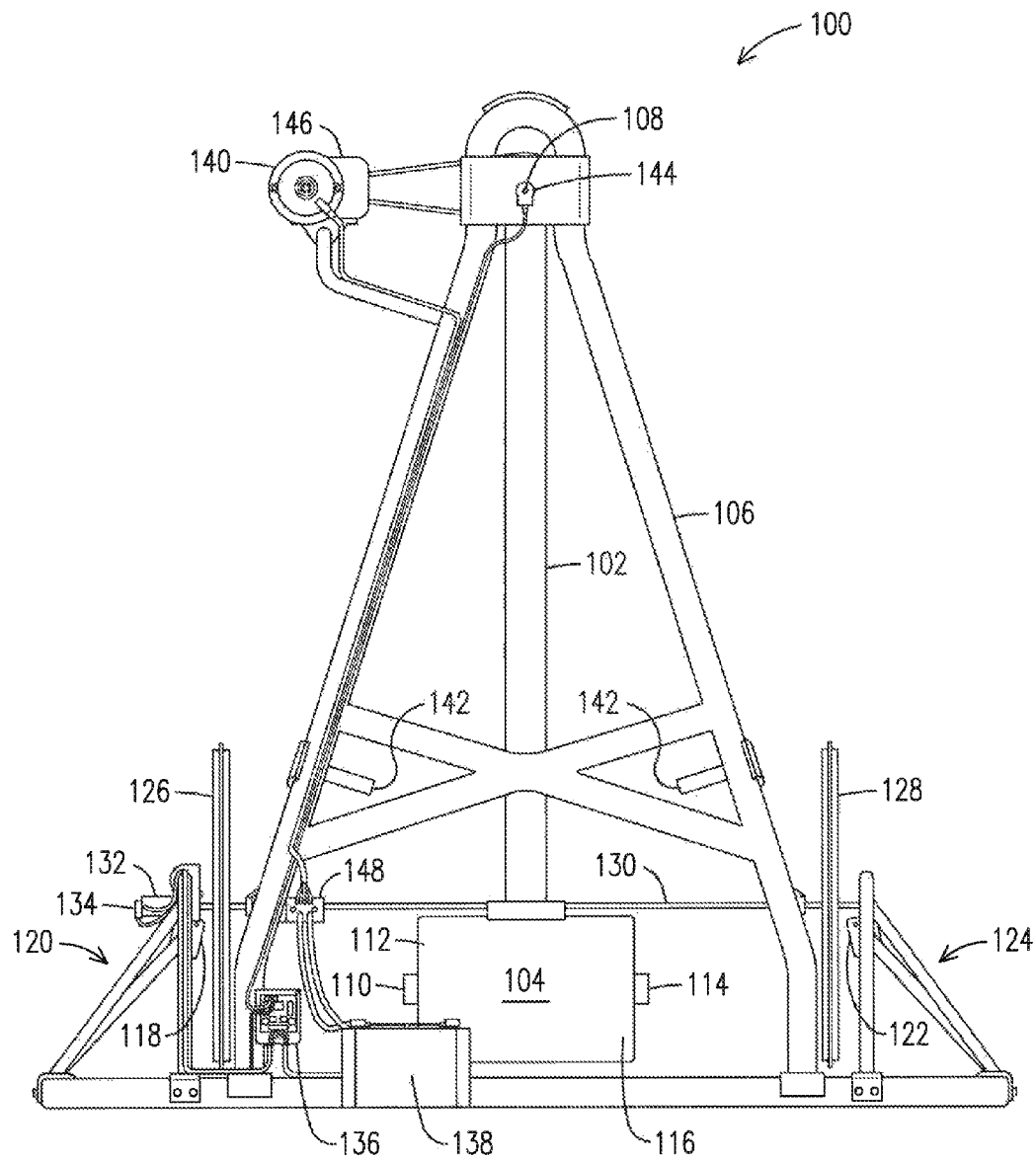
FIG. 4 is a second side view of the exemplary embodiment of the pendulum apparatus of FIG. 3.

FIG. 4 shows the exemplary embodiment of FIG. 3 from the opposite side. Visible are a second sensor 144, for example an absolute optical encoder, used to monitor an angular position of the pendulum 102, and a geared transmission 146 that is incorporated into the electrical generator 140. In addition an AC to DC converter 148 may be used to convert the alternating electrical current generated by the electrical generator 140 into direct current which the battery 138 can receive.

Figure 5:
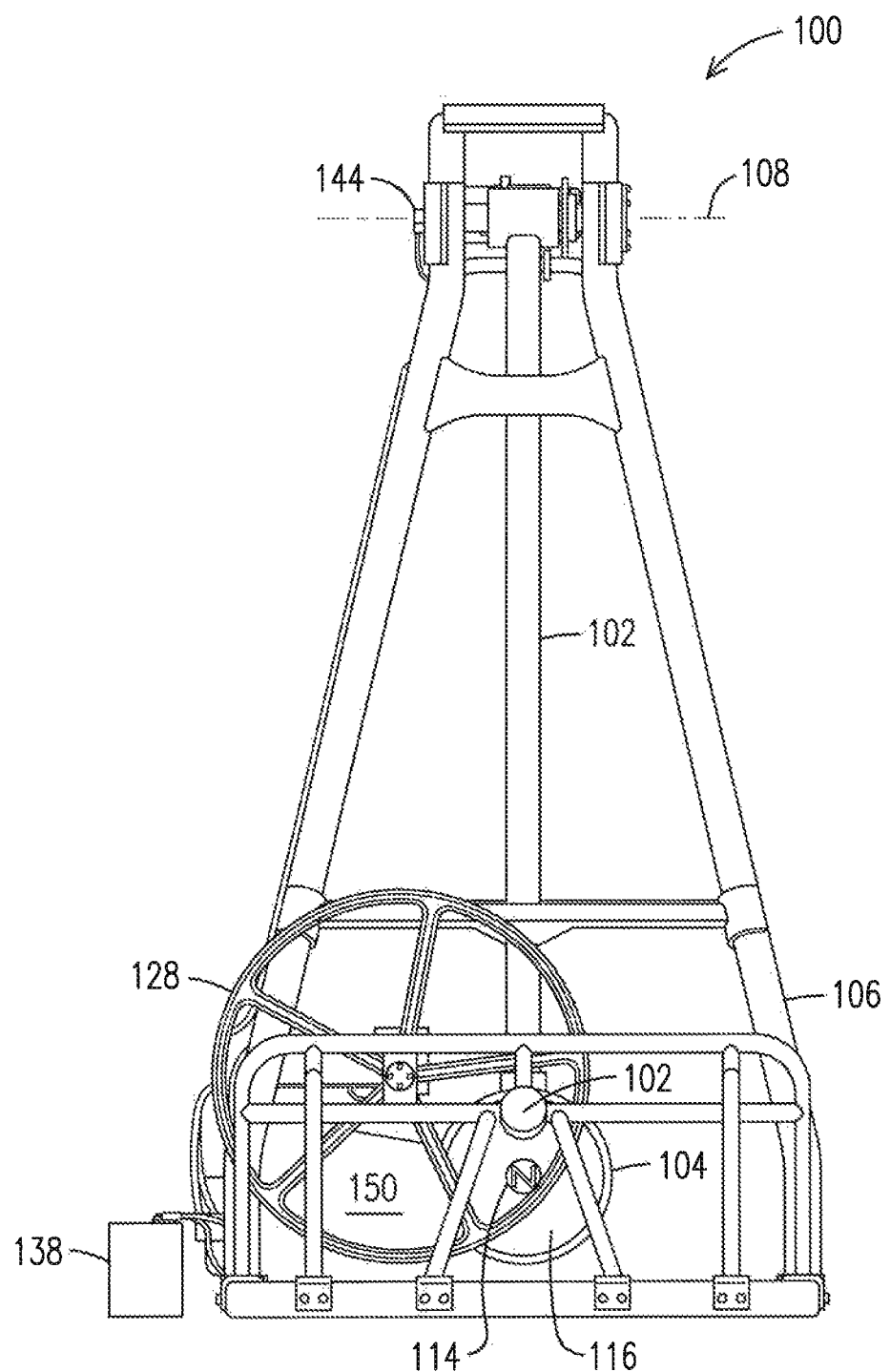
FIG. 5 is an end view of the exemplary embodiment of the pendulum apparatus of FIG. 3.
Figure 6:
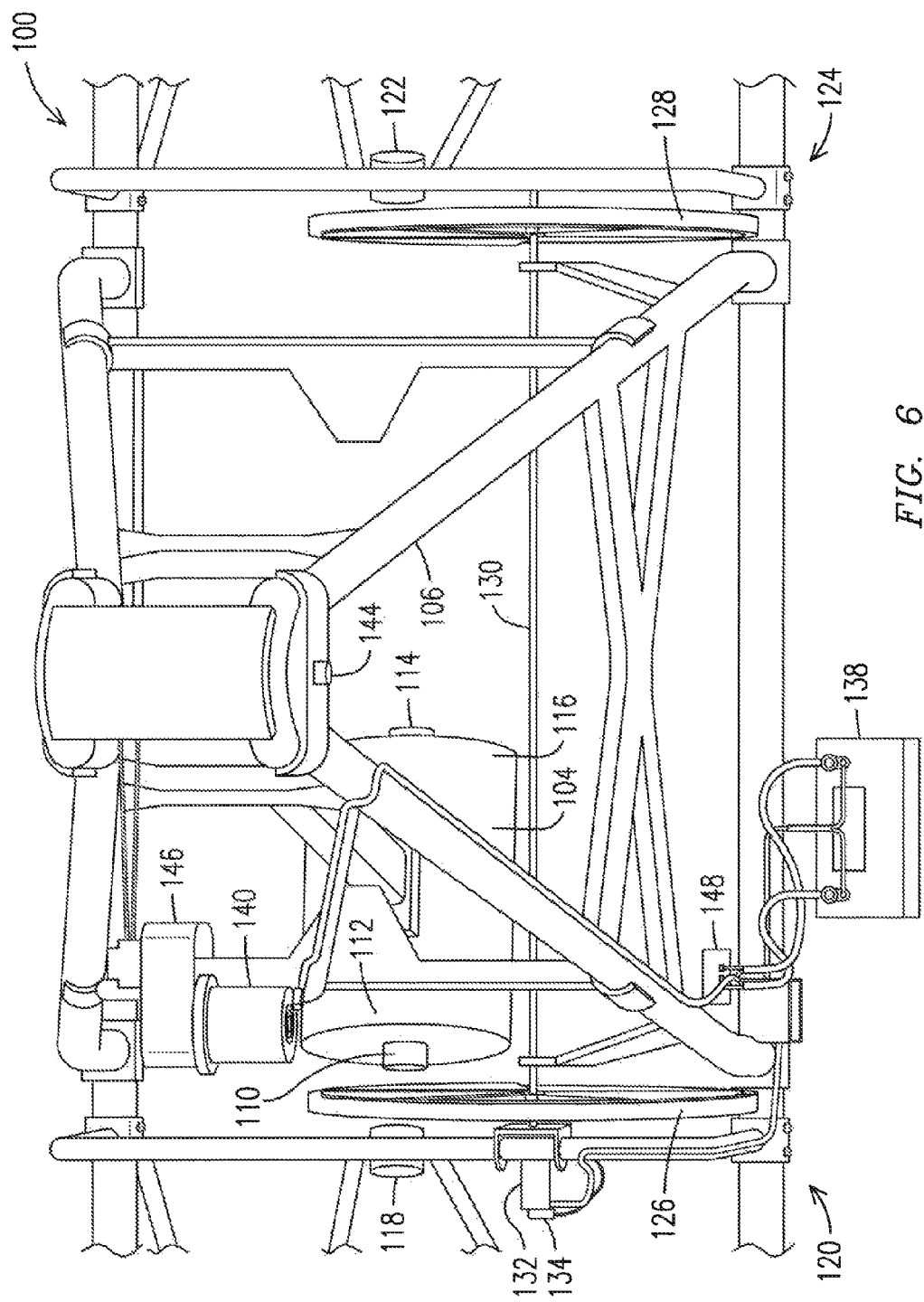
FIG. 6 is a top view of the exemplary embodiment of the pendulum apparatus of FIG. 3.
Figure 7:
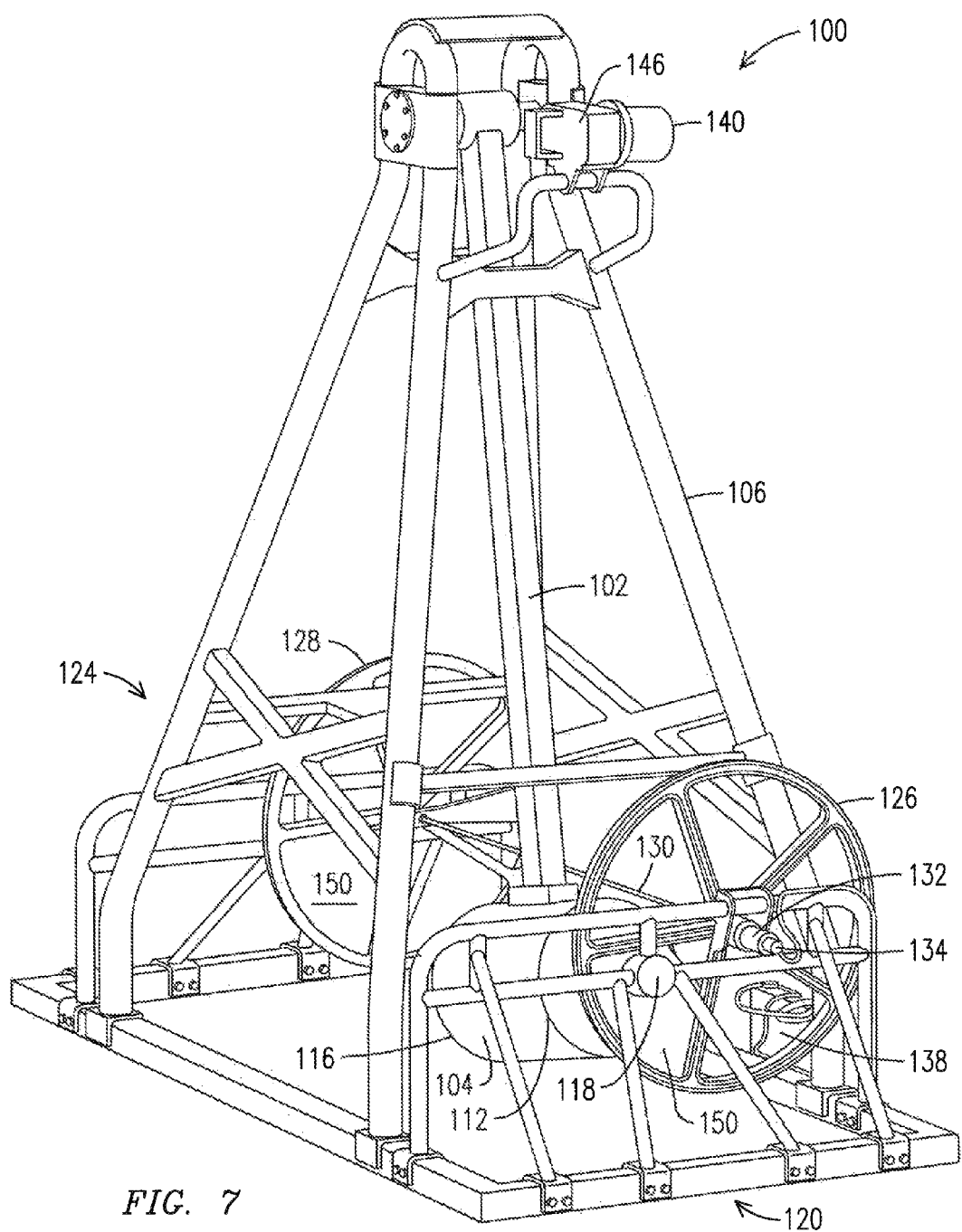
FIG. 7 is a top view of the exemplary embodiment of the pendulum apparatus of FIG. 3.

FIG. 5 shows a view looking toward the distal end 124 of the frame 106 of the exemplary embodiment of FIG. 3. Visible is a planar metal shield 150 that is present in both the first shielding apparatus 126 and the second shielding apparatus 128 and used to shield the respective stationary magnet. FIG. 6 shows a top view of the pendulum apparatus 100 and FIG. 7 show a perspective view of the pendulum apparatus 100.

Figure 8:
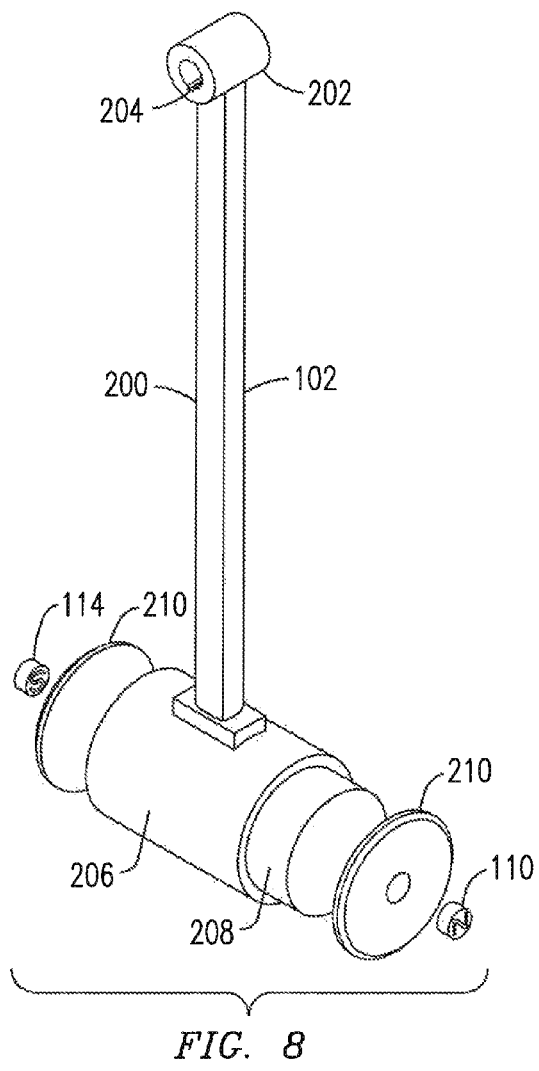
FIG. 8 is an exploded view of a pendulum.

The pendulum 102 may include several components as shown in FIG. 8, including an arm 200, a pivot axle sleeve 202, a keyway 204, a steel housing 206 surrounding a lead core 208, and capped with steel plate end caps 210 in addition to the proximate pendulum magnet 110 and the distal pendulum magnet 114. The magnets may be any magnet capable of generating sufficient force to operate the pendulum apparatus 100, including neodymium magnets. To create the necessary repulsive forces the pendulum magnets will be arranged so that similar poles are oriented toward each other.

The first shielding apparatus 126, the second shielding apparatus 128, and the framework holding the stationary magnets may be made from non magnetic materials so they do not attract the pendulum magnets during the cycle. Any attraction to the planar metal shield 150 may be unavoidable if it is made of a paramagnetic material and therefore attracted to magnetic fields. The planar metal shield 150 may be made of any suitable material that can provide sufficient shielding to permit the acceleration force to be enough larger than the deceleration force to overcome the swing resistance as detailed above. One suitable material includes 80% nickel, 4.5% molybdenum, with a balance of iron alloy, which is paramagnetic. As a result, as the planar metal shield 150 approaches the magnets during its rotation it may be drawn toward them. Likewise, the planar metal shield 150 may resist the motor's efforts to move it past the shielding position. This may result in forces within the plane of rotation and bending moments working to move the planar metal shield 150 out of the plane of rotation. To compensate for the bending moments guide bearings (not shown) may be installed to help hold the first shielding apparatus 126 and the second shielding apparatus 128 in their respective planes of rotation, which will in turn hold the respective planar metal shields 150 in their respective planes of rotation.

Figure 9:
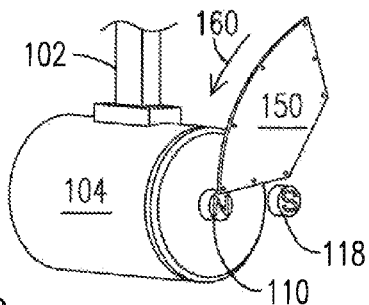
FIGS. 9-12 depict intermittent shielding of the stationary magnet.
Figure 10:
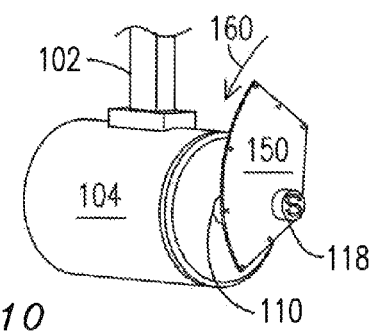
Figure 11:
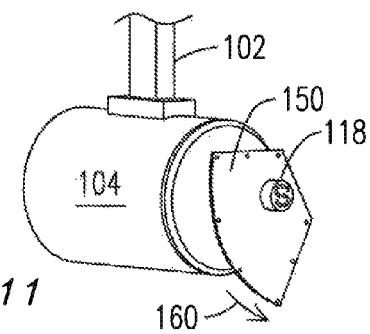
Figure 12:
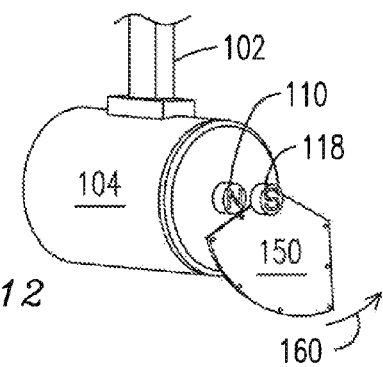

Movement of the metal shield between the stationary magnet 118 and the proximate pendulum magnet 110 can be seen in FIGS. 9-12. In FIG. 9 the planar metal shield 150 is rotating in a direction of rotation 160 and is about to begin transitioning from not shielding the stationary magnet to shielding the stationary magnet 118. As shown in FIG. 10, the planar metal shield 150 has rotated between the stationary magnet 118 and the proximate pendulum magnet 110 and therefore can be considered to be fully shielding the stationary magnet 118. In FIG. 11 the planar metal shield 150 continues to rotate but is still disposed in between the stationary magnet 118 and the proximate pendulum magnet 110 and therefore can still be considered to be fully shielding the stationary magnet 118. In FIG. 12 the planar metal shield 150 is partly between the stationary magnet 118 and the proximate pendulum magnet 110 and therefore can be considered to be transitioning from shielding the stationary magnet to not shielding the stationary magnet 118. It can be seen that in FIG. 9 that the proximate pendulum magnet 110 is approaching the stationary magnet 118 and hence the shielding is about to commence. In FIG. 12 the proximate pendulum magnet 110 is closer to the stationary magnet 118, either at or close to the apex position, and thus is ready to be accelerated through the recovery stroke.

Figure 13:
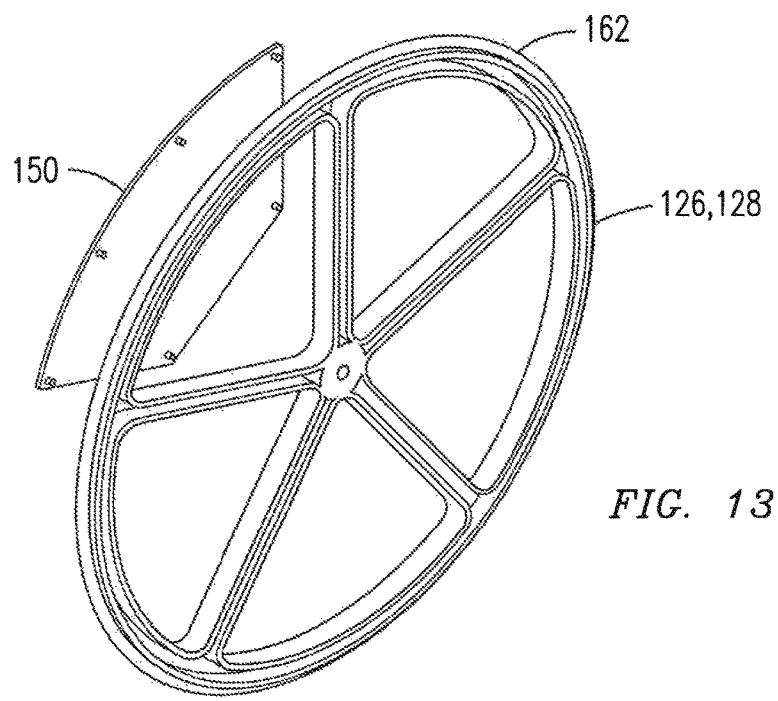
FIGS. 13-14 show a magnetic shield of the magnetic shielding apparatus.
Figure 14:
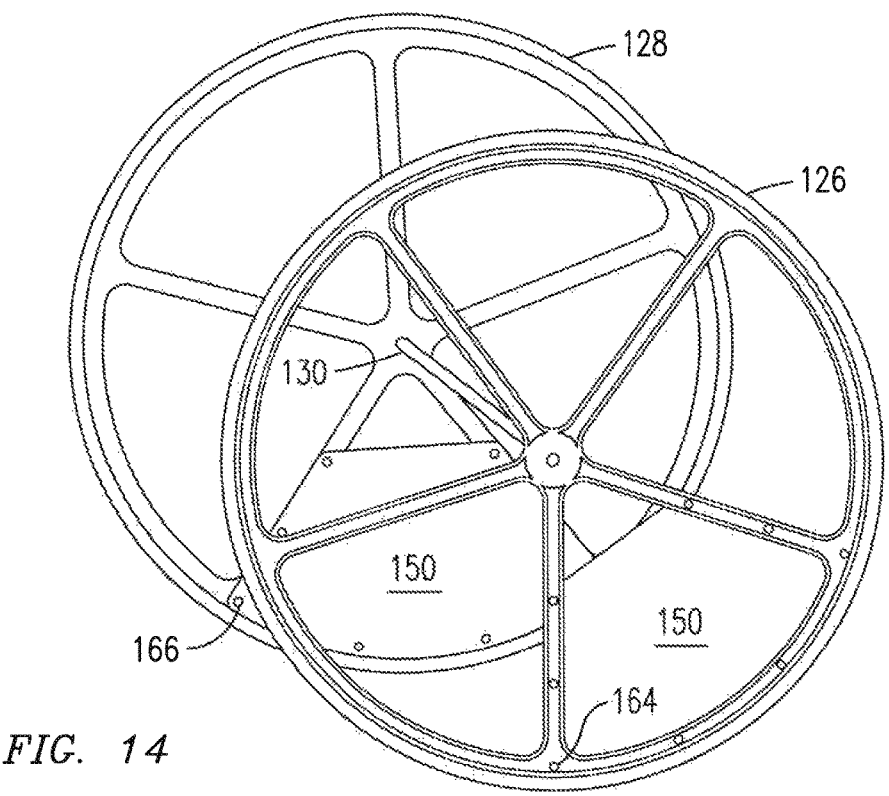

FIG. 13 shows a framework 162 present in each of the first shielding apparatus 126 and the second shielding apparatus 128 and to which the planar metal shield 150 is secured. FIG. 14 shows the first shielding apparatus 126 and the second shielding apparatus 128 and shaft 130 assembled together. A power stroke home position 164 is a reference position on the first shielding apparatus 126 used to time a rotary position of the first shielding apparatus 126. By ensuring that the power stroke home position 164 coincides with a given clocking position for a given position of the bob 104, the timing of the pendulum apparatus 100 can be maintained. Likewise, a recovery stroke home position 166 is a reference position on the second shielding apparatus 128 used to time a rotary position of the second shielding apparatus 128. Which clocking position is selected for the first shielding apparatus 126 and the second shielding apparatus 128 and the relationship of the selected clocking position to the position of the pendulum 102 is a matter of design choice and may consider such factors as an amount of deceleration of the bob 104 desired, an amount of acceleration of the bob 104 desired, a duration of the transition period between being unshielded and fully shielded, a rotational speed of the first shielding apparatus 126 and the second shielding apparatus 128, and a circumferential position of the planar metal shields 150 etc. The clocking position is based on a position of the pendulum 102, and the second sensor 144 will monitor the position of the pendulum 102 to ensure it is known.

Synchronization of the pendulum 12 and the planar metal shield 150 may be achieved via the controller 136, and the sensor 134 and the second sensor 144. The sensors and the motor 132 may be powered and controlled by the controller 136 which may receive its power from the electrical generator 140 and/or through the battery 138. Sensor 134 allows the controller 136 to calculate and maintain a speed and position of the motor 132. The controller 136 also compensates for changes in loading on the planar metal shield 150 as the planar metal shield 150 enters, travels through, and exits the magnetic fields associated with the magnets. The second sensor 144 may track an angular position and velocity of the pendulum.

The first shielding apparatus 126 may rotate at any whole number of rotations per cycle of the pendulum 102. For example, if the first shielding apparatus 126 rotates once per cycle of the pendulum, then the planar metal shield 150 will be moving the slowest and the transition from fully shielded to fully unshielded will take the longest for a given size planar metal shield 150. The first shielding apparatus 126 may alternately rotate at any integer multiple of the cycle of the pendulum 102. For example, if the first shielding apparatus 126 rotates four times per cycle of the pendulum 102, then the planar metal shield 150 will be moving faster and the transition will occur four times faster that at one rotation per cycle of the pendulum 102. It can be seen that the planar metal shield 150 associated with the first shielding apparatus 126 may be circumferentially offset from the planar metal shield 150 associated with the second shielding apparatus 128. If the duration of the power stroke and the recovery stroke were equal, then the planar metal shields 150 may be offset by 180 degrees because the bob 104 would reach an apex position every half cycle. Due to resistance from the electrical generator 140, the pendulum 102 may slow during the power stroke, thereby increasing a duration of the power stroke when compared to a duration of the recovery stroke, which experiences no extra resistance from the generator. Consequently, the offset of the planar metal shield 150 may not be 180 degrees, so that the different durations of each of the strokes can be accounted for.

Figure 15:
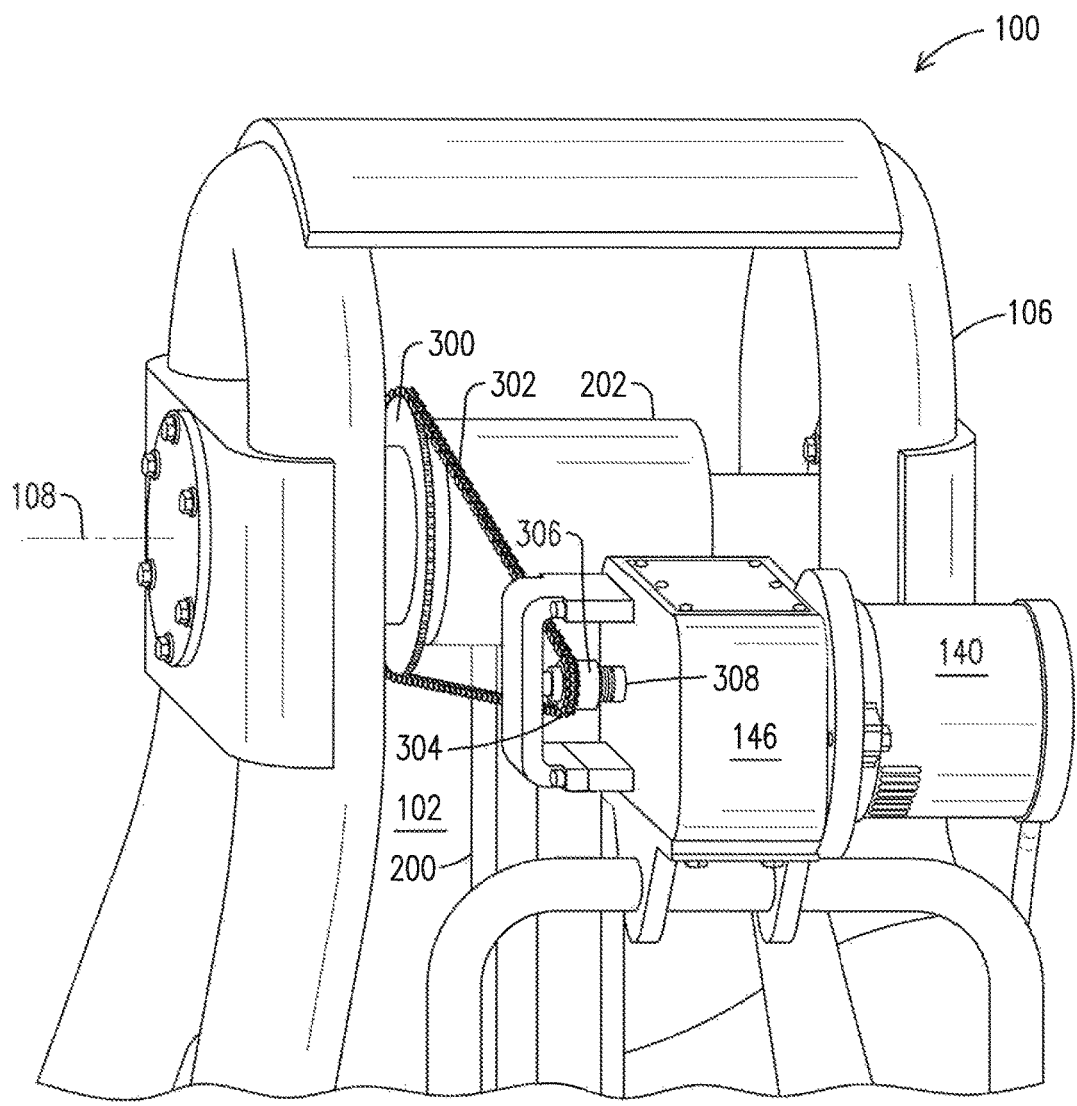
FIG. 15 is a perspective view of an electrical generator.

FIG. 15 shows the electrical generator 140 secured to the frame 106 of the pendulum apparatus 100. The pivot axle sleeve 202 of the pendulum 102 rotates during the power stroke and the recovery stroke about the pivot axis 108. A pendulum sprocket 300 rotates with the pivot axle sleeve 202. The sprocket drives a roller chain 302 that drives a transmission sprocket 304. The transmission sprocket drives the geared transmission 146 through a one-way mechanism 306 which may be, for example, a one-way bearing known to those in the art. During the recovery stroke the one-way bearing spins free on sprocket shaft 308 of the geared transmission 146. During the power stroke the one-way bearing engages the sprocket shaft 308 and turns the sprocket shaft 308 using energy from the pendulum 102. Gears in the geared transmission 146 multiply a rotary speed of the pendulum sprocket 300 to the operational speed of the electrical generator 140. This process repeats for every cycle of the pendulum 102 and enables the electrical generator 140 to produce electrical energy.

A size and output of the electrical generator 140 must be matched to the size of the pendulum. 102, and in particular, the bob 104. An electrical generator 140 with a given output will require a minimum work input. The mass of the bob 104 can be adjusted to match the work input requirement. For example, a 10,000 pound bob 104 would have a significant work output. Increasing a length of the arm 200 of the pendulum 102 would increase the torque at the pivot axis 108.

Initiating operation of the pendulum apparatus 100 may be accomplished in any number of ways. In an exemplary embodiment the electrical generator 140 may be brought to operating speed via a starter motor (not shown). During this time an output circuit (not shown) of the electrical generator 140 may be disengaged to decrease its rotational resistance. The pendulum 102 may be held in a predetermined position, for example, an apex position. One the generator is generating a desired amount of electrical energy the output circuit may be closed. The controller 136 and the motor 132 may be activated and the pendulum 102 released in a timed effort, thereby starting operation of the pendulum apparatus 100.

Figure 16:
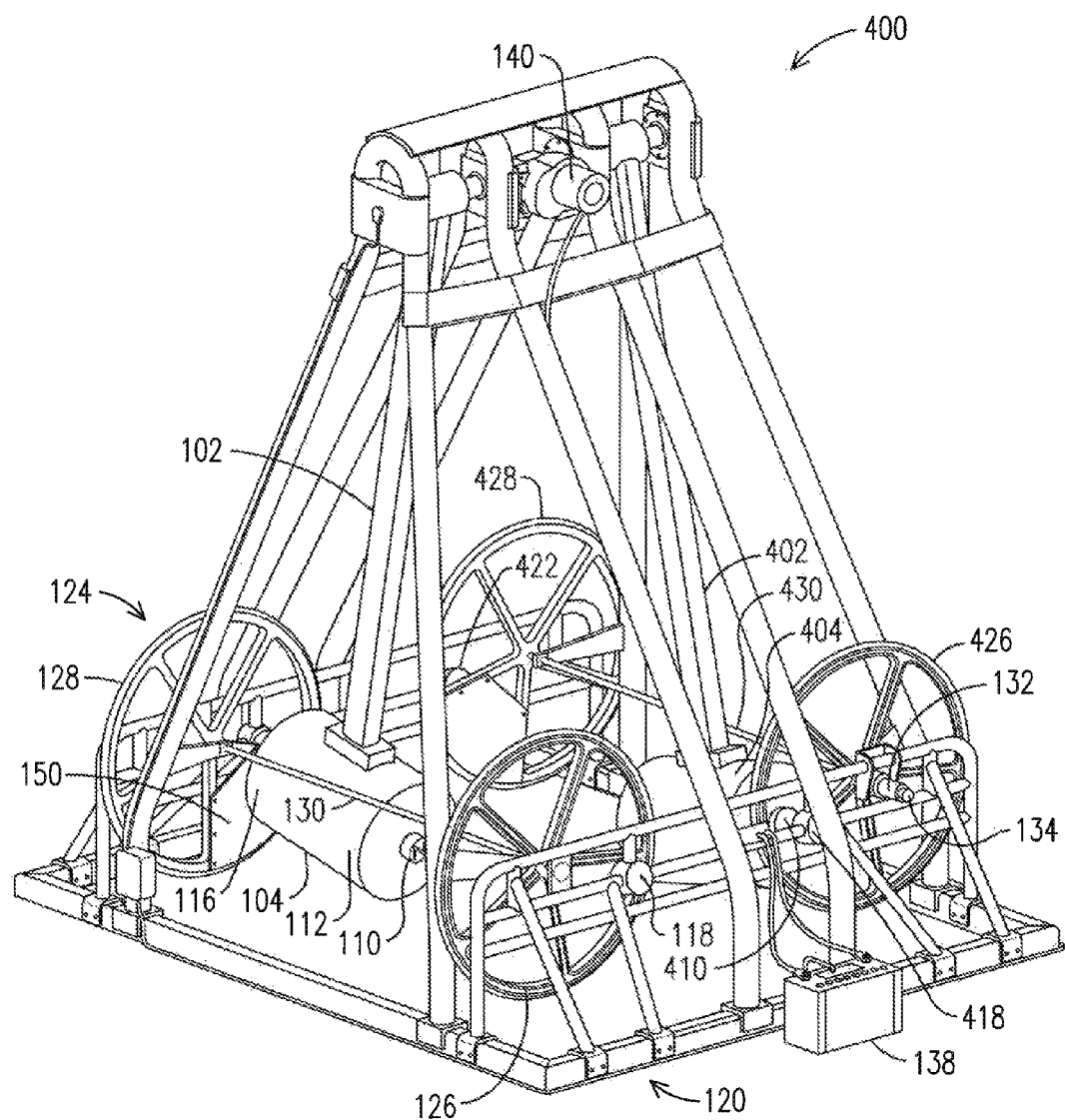
FIG. 16 is a perspective view of a two-pendulum apparatus.

FIG. 16 shows another exemplary embodiment of a pendulum apparatus 400. In this exemplary embodiment the pendulum apparatus 400 has a pendulum 102 and components similar to that of FIG. 3. However, in addition, the pendulum apparatus 400 has an additional pendulum 402 having an additional bob 404, an additional proximate pendulum magnet 410, an additional distal pendulum magnet 414 (not visible), an additional stationary magnet 418, an additional second stationary magnet 422. Further included are an additional first shielding apparatus 426 and an additional second shielding apparatus 428, each having respective planar metal shields 150 and each connected with an additional shaft 430. In this exemplary embodiment the additional pendulum 402 and associated components act much the same as the pendulum 102 of FIG. 3. Consequently, each pendulum is capable of developing usable energy for the electrical generator 140. However, by having more than one pendulum the power strokes of each pendulum can be timed in a variety ways. For example, staggering the power strokes will enable more continual power input to the generator. By staggering their timing by 180 degrees near continual input to the generator may be maintained.

From the foregoing it can be seen that the inventor has developed an innovative pendulum apparatus that can sustain the swing of a pendulum through a clever intermittent shielding arrangement, and this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An apparatus, comprising:
    a pendulum comprising a pendulum magnet arrangement;
    a stationary magnet positioned such that a magnetic field of the stationary magnet repels the pendulum magnet arrangement as it approaches the stationary magnet; and
    a magnetic shielding apparatus configured to intermittently shield the stationary magnet from the pendulum magnet arrangement,
    wherein the magnetic shielding apparatus is configured to shield the stationary magnet from the pendulum magnet arrangement as the pendulum magnet arrangement approaches an apex position of a cycle; and
    wherein as the pendulum magnet arrangement recedes from the apex position a repulsion associated with an interaction of a fully unshielded magnetic field of the stationary magnet and a magnetic field of the pendulum magnet arrangement is effective to accelerate the pendulum.

2. The apparatus of claim 1, further comprising:
    a second stationary magnet positioned proximate an opposite apex position of the cycle such that a magnetic field of the second stationary magnet repels the pendulum magnet arrangement as it approaches the second stationary magnet;
    a second magnetic shielding apparatus configured to intermittently shield the second stationary magnet;
    wherein the magnetic shielding apparatus is configured to shield the second stationary magnet from the pendulum magnet arrangement as the pendulum magnet arrangement approaches the opposite apex position of the cycle; and
    wherein as the pendulum magnet arrangement recedes from the opposite apex position a repulsion associated with an interaction of a fully unshielded magnetic field of the second stationary magnet and the magnetic field of the pendulum magnet arrangement is effective to accelerate the pendulum magnet arrangement.

3. The apparatus of claim 2, wherein the repulsion associated with the interaction of the fully unshielded magnetic field of the stationary magnet and the magnetic field of the pendulum magnet arrangement is sufficient to enable the pendulum magnet arrangement to reach the opposite apex position; and
    wherein the repulsion associated with the interaction of the fully unshielded magnetic field of the second stationary magnet and the magnetic field of the pendulum magnet arrangement is sufficient to enable the pendulum magnet arrangement to reach the apex position.

4. The apparatus of claim 1, further comprising an electrical generator configured to draw energy from movement of the pendulum, wherein the electrical generator draws the energy from the pendulum during a power stroke that occurs when the pendulum approaches the stationary magnet.

5. The apparatus of claim 4, further comprising a one-way mechanism that enables the electrical generator to draw the energy during the power stroke only.

6. The apparatus of claim 5, further comprising:
an additional pendulum comprising an additional pendulum magnet arrangement;
an additional stationary magnet; and
an additional magnetic shielding apparatus,
wherein the additional pendulum, the additional stationary magnet, and the additional magnetic shielding apparatus are configured to operate like the pendulum; and
wherein the electrical generator draws power from the additional pendulum during a power stroke of the additional pendulum that is out of synchronization with the power stroke of the pendulum.

7. The apparatus of claim 6, wherein the pendulum and the additional pendulum cycle 180 degrees out of synchronization.

8. The apparatus of claim 4, wherein the magnetic shielding apparatus is powered by a motor powered by the electrical generator.

9. The apparatus of claim 8, further comprising an energy storage device, wherein the electrical generator charges the energy storage device and the energy storage device powers the magnetic shielding apparatus.

10. The apparatus of claim 4, wherein a resistance of the electrical generator is actively controlled to ensure the pendulum can return to the apex position.

11. The apparatus of claim 1, wherein the magnetic shielding apparatus comprises a planar metal shield moving in a plane oriented transverse to an arc defined by movement of the pendulum magnet arrangement and disposed between the stationary magnet and the pendulum magnet arrangement.

12. An apparatus, comprising:
a pendulum comprising a pendulum magnet arrangement;
a stationary magnet positioned such that a magnetic field of the stationary magnet repels the pendulum magnet arrangement during a cycle of the pendulum; and
a magnetic shielding apparatus configured to move a magnetic shield from between the stationary magnet and the pendulum magnet arrangement to a position not between the stationary magnet and the pendulum magnet arrangement;
wherein when the magnetic shield is in the position between the stationary magnet and the pendulum magnet arrangement a repulsive force between the stationary magnet and the pendulum magnet arrangement is reduced; and
wherein the movement of the magnetic shield is configured to ensure less energy is imparted to the pendulum as the pendulum approaches an apex position of the cycle than is imparted to the pendulum as the pendulum recedes from the apex position.

13. The apparatus of claim 12, wherein a difference between the energy imparted to the approaching pendulum and the receding pendulum is at least equal to the energy lost during the cycle.

14. The apparatus of claim 12, wherein the movement of the magnetic shield is configured to control an approach of the pendulum to the apex position.

15. The apparatus of claim 12, further comprising an electrical generator configured to draw energy from movement of the pendulum.

16. The apparatus of claim 12, further comprising:
a second stationary magnet positioned such that a magnetic field of the second stationary magnet repels the pendulum magnet arrangement during the cycle of the pendulum; and
a second magnetic shielding apparatus configured to move a second magnetic shield from between the second stationary magnet and the pendulum magnet arrangement to a position not between the second stationary magnet and the pendulum magnet arrangement;
wherein when the second magnetic shield is in the position between the second stationary magnet and the pendulum magnet arrangement a repulsive force between the second stationary magnet and the pendulum magnet arrangement is reduced; and
wherein the movement of the second magnetic shield is configured to ensure less energy is imparted to the pendulum as the pendulum approaches an opposite apex position of the cycle than is imparted to the pendulum as the pendulum recedes from the opposite apex position.

17. The apparatus of claim 16, wherein a net energy imparted to the pendulum by the stationary magnets at least equals energy lost during the cycle through friction.

18. An apparatus, comprising:
a pendulum comprising a pendulum magnet arrangement;
a stationary magnet positioned such that a magnetic field of the stationary magnet interacts with a magnetic field of the pendulum magnet arrangement during a cycle of the pendulum; and
a magnetic shielding apparatus configured to selectively position a magnetic shield anywhere from a position between the stationary magnet and the pendulum magnet arrangement and a position not there between, wherein when so positioned the magnetic shield is effective to reduce the interaction between the magnetic fields;
wherein a timing of the selective positioning is effective to allow more interaction between the magnetic fields as the pendulum recedes from the stationary magnet than when the pendulum approaches the stationary magnet.

19. The apparatus of claim 18, wherein a difference in energy imparted to the pendulum by the greater interaction when receding and energy imparted to the pendulum by a lesser interaction during approach is sufficient to overcome non magnetic energy losses experienced during the cycle.

20. The apparatus of claim 18, further comprising an electrical generator configured to draw energy from movement of the pendulum.

* * * * *